(12) United States Patent
Miller (10) Patent No.: US 8,322,870 B2
(45) Date of Patent: Dec. 4, 2012

(54) FAST STEERING, DEFORMABLE MIRROR SYSTEM AND METHOD FOR MANUFACTURING THE SAME

(75) Inventor: Kirk A. Miller, Dallas, TX (US)

(73) Assignee: Raytheon Company, Waltham, MA (US)

( * ) Notice: Subject to any disclaimer, the term of this patent is extended or adjusted under 35 U.S.C. 154(b) by 104 days.

(21) Appl. No.: 12/887,364

(22) Filed: Sep. 21, 2010

(65) Prior Publication Data

US 2012/0069463 A1    Mar. 22, 2012

(51) Int. Cl.
*G02B 7/198* (2006.01)
(52) U.S. Cl. ...................................... 359/849
(58) Field of Classification Search ........... 359/846–849
See application file for complete search history.

(56) References Cited

U.S. PATENT DOCUMENTS

| | | | |
|---|---|---|---|
| 4,194,189 A | | 3/1980 | Lewiner et al. |
| 4,655,563 A | * | 4/1987 | Plante et al. .................. 359/849 |
| 5,229,889 A | * | 7/1993 | Kittell .......................... 359/849 |
| 5,526,208 A | * | 6/1996 | Hatch et al. ................. 360/294.1 |
| 6,024,340 A | * | 2/2000 | Lazarus et al. ........... 251/129.06 |
| 6,325,638 B1 | * | 12/2001 | Chapin et al. .................. 439/73 |
| 7,380,950 B1 | * | 6/2008 | Lorell et al. .................. 359/849 |
| 7,443,619 B2 | * | 10/2008 | Sakino et al. ................. 359/819 |
| 2006/0050419 A1 | * | 3/2006 | Ealey ............................ 359/849 |
| 2010/0202071 A1 | * | 8/2010 | Preumont et al. ............. 359/849 |

FOREIGN PATENT DOCUMENTS

KR    20090063012 A    6/2009

OTHER PUBLICATIONS

Cadiergues, L et al., "A Mirror Control Mechanism for Space Telescope", Proceedings of the 10th European Space Mechanisms and Tribology Symposium, 24-26, pp. 177-182 (Sep. 2003).
European Search Report; European Application No. 11174455.3–2217; European Filing Date Dec. 13, 2011; Date of Mailing Dec. 29, 2011; 7 pages.

* cited by examiner

*Primary Examiner* — Mark Consilvio
(74) *Attorney, Agent, or Firm* — Cantor Colburn LLP (57) ABSTRACT

A fast-steering, deformable mirror system is configured to manipulate a reflective surface in order to control the reflection of electromagnetic radiation off of the reflective surface. The system is configured to steer the reflective surface as a unit, and also to deform the reflective surface. The system is designed to reduce hysteresis in drive signals that control deformation of the reflective surface, to maintain an overall size and/or footprint of conventional fast-steering, non-deformable mirror systems, and/or provide other enhancements.

20 Claims, 12 Drawing Sheets

FAST STEERING, DEFORMABLE MIRROR SYSTEM AND METHOD FOR MANUFACTURING THE SAME

BACKGROUND

Embodiments of this disclosure relate to a fast-steering, deformable mirror system, and a method for manufacturing the same. The mirror system may be deployed in a sensor or video system.

Fast-steering mirror systems are known, and provide the backbone of some conventional sensors and/or video systems. Deformable mirror systems are also known, and may be used to correct for thermal distortion and/or other optical phenomena and/or artifacts.

In conventional fast-steering mirror systems, providing electrical signals from a base to the assembly carrying the mirror surface may be a challenge because the freedom of motion between these components. Known systems do not include a solution for carrying such signals in a compact configuration and/or without the introduction of signal disruption due to hysteresis and/or other phenomena.

A fast-steering, deformable mirror system may require drive signals for the deformable mirror surface to be conveyed across the interface between the base and the assembly carrying the mirror surface. As such, a compact, inexpensive fast-steering, deformable mirror system capable of providing drive signals to the assembly carrying the deformable mirror surface without signal disruption may not be currently available.

SUMMARY

One aspect of this disclosure relates to a fast-steering, deformable mirror system. In one embodiment, the system comprises a base, a deformable mirror assembly, a mirror steering assembly, and an electrical mirror interface. The deformable mirror assembly comprises a reflective surface and a plurality of deformation actuators configured to controllably deform the reflective surface. The deformable mirror assembly is mounted to the base such that the deformable mirror assembly is movable as a unit with respect to the base with at least two degrees of freedom. The mirror steering assembly is configured to actuate the deformable mirror assembly as a unit with respect to the base. The electrical mirror interface physically is connected to each of the base and the deformable mirror assembly, and is configured to convey control signals from a drive circuit to the deformable mirror assembly that drive the deformation actuators. The electrical mirror interface is formed in part from an elastically resilient polymer material.

Another aspect of this disclosure relates to a method of manufacturing a fast-steering, deformable mirror system. In one embodiment, the method comprises mounting a base and a deformable mirror assembly such that the deformable mirror assembly is movable as a unit with respect to the base with at least two degrees of freedom, wherein the deformable mirror assembly comprises a reflective surface and a plurality of deformation actuators configured to controllably deform the reflective surface; providing a mirror steering assembly on the base, the mirror steering assembly being configured to actuate the deformable mirror assembly as a unit with respect to the base; and connecting an electrical mirror interface physically to each of the base and the deformable mirror assembly, the electrical mirror interface being configured to convey control signals from a drive circuit to the deformable mirror assembly that drive the deformation actuators, the electrical mirror interface being formed in part from an elastically resilient polymer material.

These and other features and characteristics of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
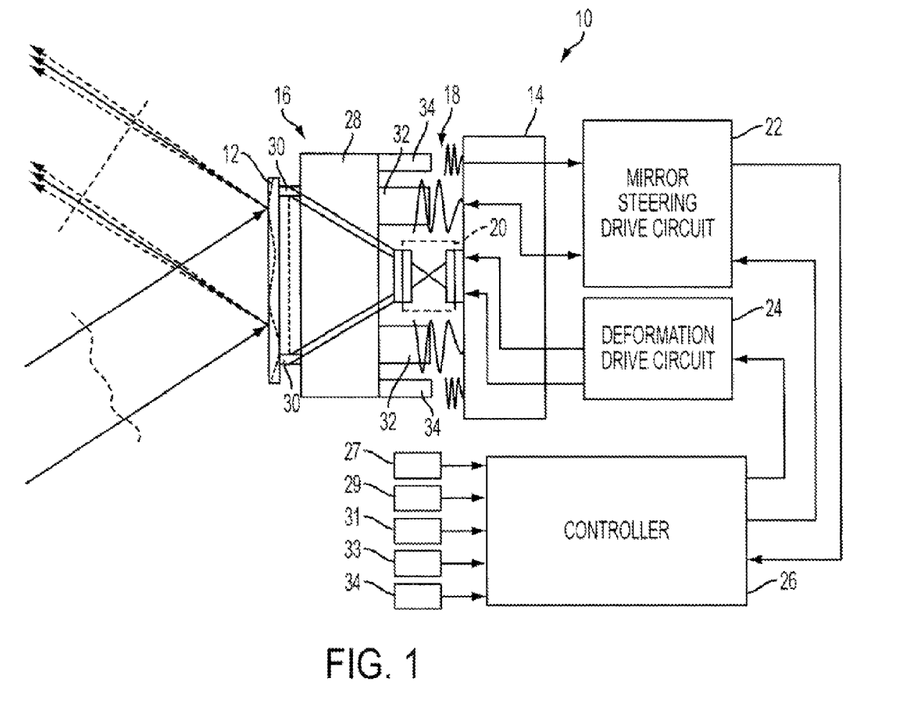
FIG. 1 illustrates a fast-steering, deformable mirror system, in accordance with one or more embodiments of this disclosure.

FIG. 1 is a diagram illustrating the function of some embodiments of a fast-steering, deformable mirror system 10. System 10 is configured to manipulate reflective surface 12 in order to control the reflection of electromagnetic radiation off of reflective surface 12. System 10 is configured to steer reflective surface 12 as a unit, and also to deform reflective surface 12. System 10 is designed to reduce hysteresis in drive signals that control deformation of reflective surface 12, to maintain an overall size and/or footprint of conventional fast-steering, non-deformable mirror systems, and/or provide other enhancements. Deforming reflective surface 12 may mean to change the position and/or orientation of one point on or portion of reflective surface 12 separate from the rest of reflective surface 12. System 10 is deployable within a sensor or video system, and/or may form part of a vehicle, vessel, or aircraft carrying such a sensor or video system (e.g., an unmanned vehicle, vessel, or aircraft). System 10 may include one or more of base 14, deformable mirror assembly 16, mirror steering assembly 18, mirror mount assembly 20, one or more mirror steering drive circuits 22, deformation drive circuit 24, controller 26, and/or other components.

Base 14 is configured to provide a substrate on which at least some of the other components of system 10 can be mounted. In use, base 14 is mounted within the larger system that system 10 functions (e.g., within a larger sensor system). Base 14 may be formed from one or more of aluminum alloys, stainless steels, beryllium, or low expansion nickel alloys, and/or other materials. Base 14 may be formed as a single component or as a plurality of separate components coupled together in a fixed configuration. For the purposes of this disclosure, a component may be considered to be connected to base 14 if some point or portion of the component is fixed in position with respect to base 14. This may include a component fixed with respect to base 14 by being secure in the'environment within which base 14 is installed (e.g., an overall sensor housing or seat), a component affixed at a point or portion to some other component that is immovable (or substantially so) with respect to base, and/or other components that have a point or portion fixed in position with respect to base 14.

Deformable mirror assembly 16 is configured to deform reflective surface 12. Deformable mirror assembly 16 includes reflective surface 12, substrate 28, one or more deformation actuators 30, and/or other components. Deformable mirror assembly 16 may be formed as a unit that is separate from base 14 and mounted to base 14 (e.g., as discussed further below). Deformable mirror assembly 16 may deform reflective surface 12 in order to correct for thermal effects, residual manufacturing imperfections, focus errors, atmospheric distortions near sensor window, and/or other optical effects or artifacts.

Deformation actuators 30 are carried by substrate 28. Deformation actuators 30 are configured to actively and controllably move different points and/or portions of reflective surface 12 relative to substrate 28 separate from the rest of reflective surface 12. Deformation actuators 30 may include, for example, one or more of piezoelectric elements, electrostrictive, and/or other actuators.

Mirror steering assembly 18 is configured to actively and controllably actuate deformable mirror assembly 16 as a unit with respect to base 14. Mirror steering assembly 18 is controlled to actuate deformable mirror assembly 16 in order to provide overall mirror steering with respect to reflective surface 12. Mirror steering assembly 18 may be configured as a fast-steering system. Mirror steering assembly 18 may include one or more of steering actuators 32, one or more pickoff members 34, and/or other components.

Steering actuators 32 are configured to actively position deformable mirror assembly 16 with respect to base 14. Steering actuators 32 are mounted to base 14 in a fixed configuration (e.g., fastened, attached, affixed, and/or otherwise secured). Steering actuators 32 may include linear drive members that expand and contract linearly. By coordinating the expansion and contraction of steering actuators 32, deformable mirror assembly 16 can be steered with respect to base 14.

Pickoff members 34 may be configured to define the extremes of relative movement of deformable mirror assembly 16 as a unit with respect to base 14. The definition of these extremes may be a configurable/controllable variable, or may be set at manufacture or calibration.

Mirror mount assembly 20 is configured to mount deformable mirror assembly 16 to base 14 such that deformable mirror assembly 16 is movable as a unit with respect to base 14. Mirror mount assembly 20 may be configured to permit relative motion between deformable mirror assembly 16 and base 14 in at least two degrees of freedom. Some exemplary configurations of mirror mount assembly 20 may be described hereafter (see FIGS. 3, 4, 9, and 10, and the accompanying description). The mirror mount assembly 20 may include a suspension assembly (not shown in FIG. 1) configured to resiliently and elastically bias deformable mirror assembly 16 into a default position with respect to base 14.

Mirror steering drive circuits 22 are configured to drive mirror steering assembly 18. As such, mirror steering drive circuits 22 are electrically coupled with steering actuators 32 and/or pickoff members 34 to provide signals thereto that control the functionality of steering actuators 32 and/or pickoff members 34. For example, the signals provided from mirror steering drive circuits 22 to steering actuators 32 drive steering actuators 32 to actively control the position of deformable mirror assembly 16 with respect to base 14. When system 10 is installed for use, the position of mirror steering drive circuits 22 may be held fixed (or substantially fixed) with respect to base 14.

Deformation drive circuit 24 is configured to drive deformation actuators 30. As such, deformation drive circuit 24 is electrically coupled with deformation actuators 30 to provide signals thereto that control the functionality of deformation actuators 30. In particular, the signals generated by deformation drive circuit 24 drive deformation actuators 30 to actively deform reflective surface 12. When system 10 is installed for use, the position of mirror steering drive circuits 22 may be held fixed (or substantially fixed) with respect to base 14.

Controller 26 is configured to provide input to mirror steering drive circuits 22 and deformation drive circuit 24 that is used by mirror steering drive circuits 22 and deformation drive circuit 24 to generate their respective output signals. Controller 26 may use as input parameters such as, for example, 27 inertial angular rate inputs, 29 inertial acceleration inputs, 31 wave front sensor input, 33 video sharpness statistics, 35 factory offsets, and/or other parameters.

As deformable mirror assembly 16 is moved about by mirror steering drive circuits 22 with respect to base 14, the drive signals from deformation drive circuit 24 to deformable mirror assembly 16 may be conveyed through relative movement between deformable mirror assembly 16 and deformation drive circuit 24. In order to provide the signals from deformation drive circuit 24 to deformable mirror assembly 16, system 10 includes an electrical mirror interface (not particularly shown in FIG. 1) that is physically connected to deformable mirror assembly 16 and deformation drive circuit 24. The electrical mirror interface is formed in part from an elastically resilient polymer material that flexes during relative movement between deformable mirror assembly 16 and base 14. The elastically resilient polymer material may include one or more of polyimide, polyether ether ketone, polyester, G10, and/or other materials. The electrical mirror interface may be formed as a flexible circuit that transmits signals from deformation drive circuit 24 to deformable mirror assembly 16.

In some embodiments, system 10 includes a suspension assembly that biases deformable mirror assembly 16 into a default position with respect to base 14. The electrical mirror interface, which is formed from an elastically resilient material, may form at least a portion of the suspension assembly. In some embodiments, the electrical mirror interface is the only component providing a substantial bias to deformable mirror assembly 16 biasing deformable mirror assembly 16 toward the default position. In some embodiments, the electrical mirror interface is the only component providing any bias to deformable mirror assembly 16 biasing deformable mirror assembly 16 toward the default position.

It will be appreciated that due to the myriad configurations in which a fast-steering mirror may be mounted to a base, the electrical mirror interface and/or the suspension assembly may take a variety of different shapes. The exemplary configurations of the suspension assembly and the electrical mirror interface provided below are exemplary and not limiting. The scope of this disclosure includes other configurations in which the electrical mirror interface is formed in part from an elastically resilient polymer material, and/or in which the electrical mirror interface forms at least part of the suspension assembly.

Figure 2:
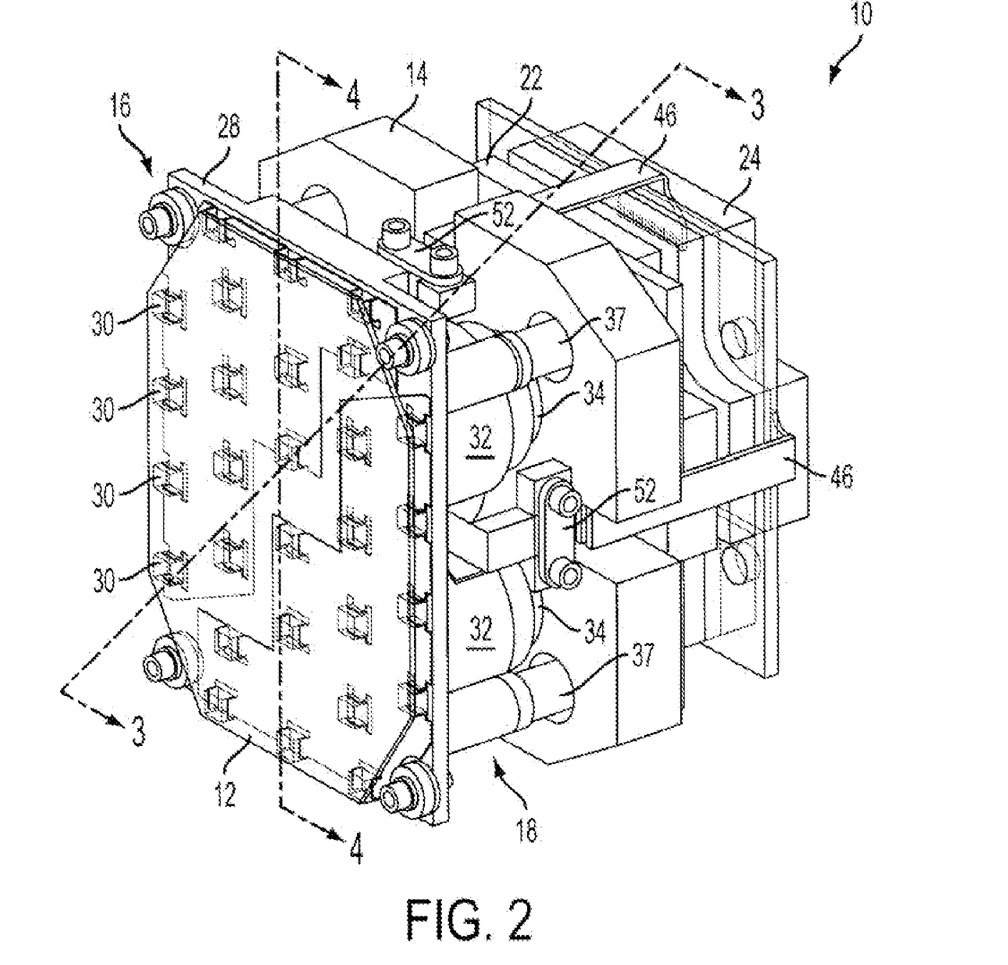
FIG. 2 illustrates a fast-steering, deformable mirror system, in accordance with one or more embodiments of this disclosure.
Figure 3:
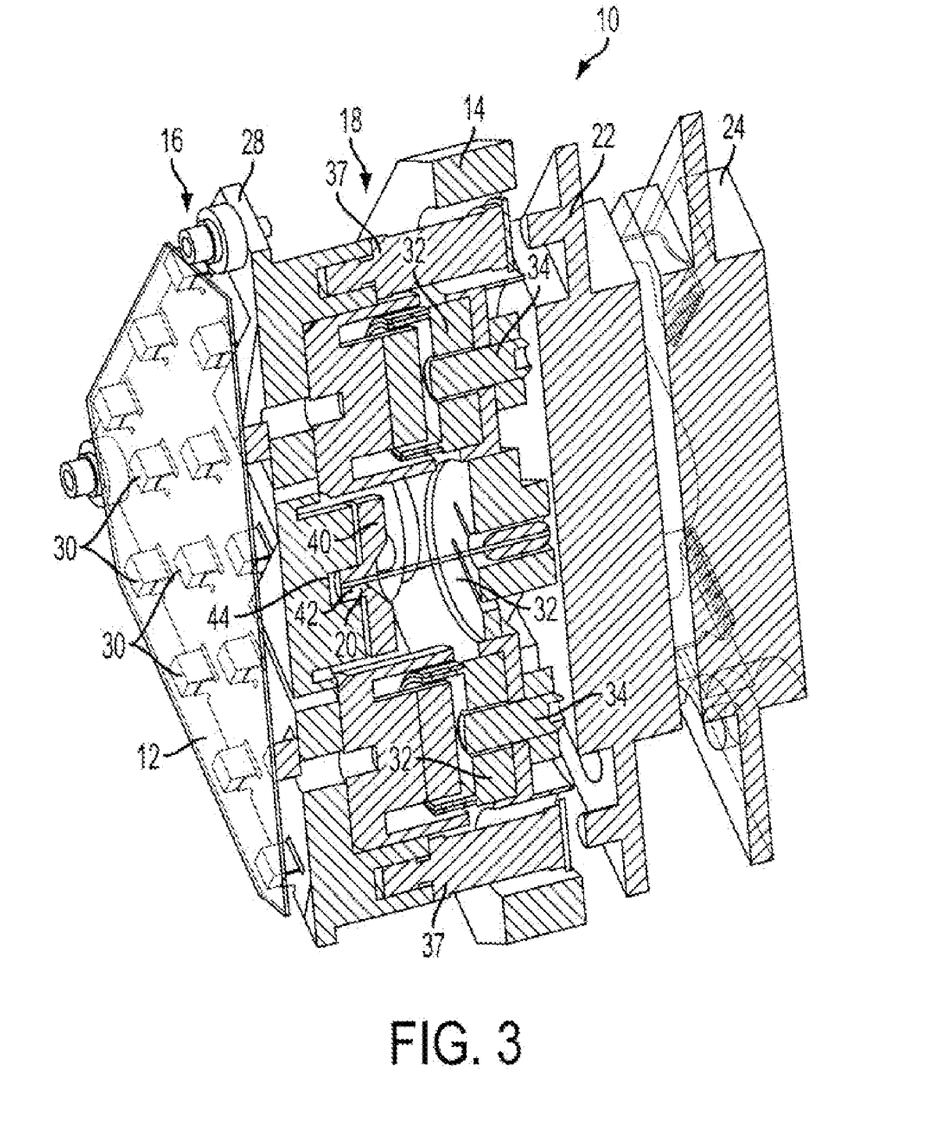
FIG. 3 illustrates a section of a fast-steering, deformable mirror system, in accordance with one or more embodiments of this disclosure.
Figure 4:
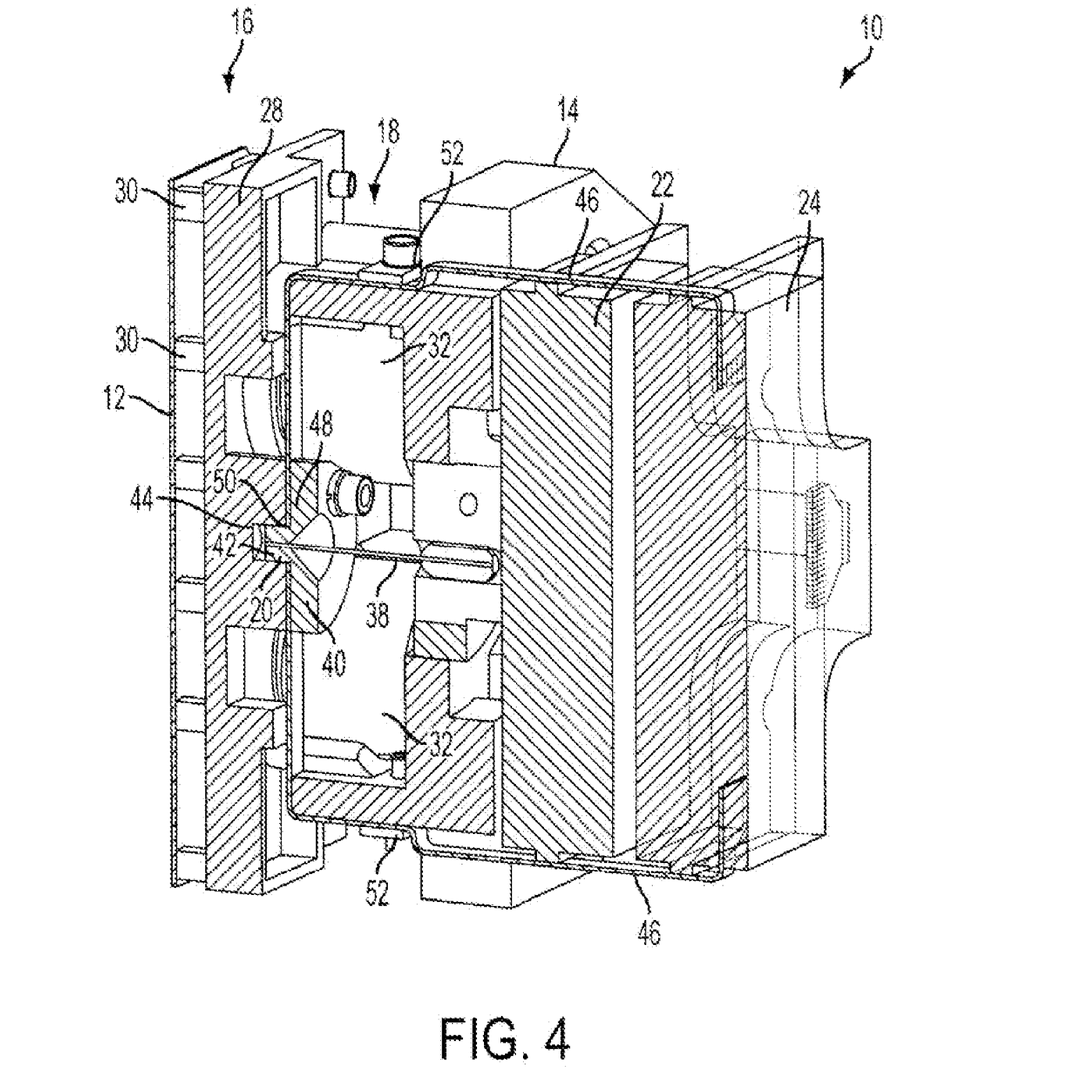
FIG. 4 illustrates a section of a fast-steering, deformable mirror system, in accordance with one or more embodiments of this disclosure.

FIG. 2 illustrates some embodiments of system 10 in which a diaphragm suspension is implemented. FIGS. 3 and 4 illustrate cross-sections of system 10 taken along section lines 3-3 and 4-4, respectively. The section shown in FIG. 3 illustrates the internals of steering actuators 32 and pickoff members 34, while FIG. 4 provides a more direct view of a diaphragm suspension assembly 36 installed on system 10. A set of balancing weights 37 is carried by mirror steering assembly 18, and sit in corresponding openings in base 14.

To increase the frequency of deformable mirror assembly 16 with respect to base 14 normal to reflective surface 12, mirror mount assembly 20 includes normal support 38. Normal support 38 is fixed at one end with respect to base 14, and the other end holds mirror seat 40. Mirror seat 40 includes central protrusion 42 that extends into a corresponding recess 44 formed in deformable mirror assembly 16. This configuration of mirror mount assembly 20 does not appreciably effect the rotational natural frequencies of deformable mirror assembly 16 parallel to reflective surface 12.

As can be seen in FIG. 4, diaphragm suspension assembly 36 comprises a set of elastic arms 46 and annular junction 48. Arms 46 extend from deformation drive circuit 24 (which is disposed on a side of base 14 opposite from deformable mirror assembly 16), travel around base 14, and arrive at annular junction 48 perpendicular to each other. Opening 50 formed in annular junction 48 corresponds to central protrusion 42 such that central protrusion 42 extends therethrough. In order to provide tension to the diaphragm formed by arms 46, diaphragm suspension assembly 36 includes a set of clamps 52. Clamps 52 fix arms 46 in tension with respect to base 14. Therefore, as deformable mirror assembly 16 is driven to move with respect to base 14, arms 46 flex elastically and bias deformable mirror assembly 16 back toward the default position shown in FIGS. 2-4.

Figure 5:
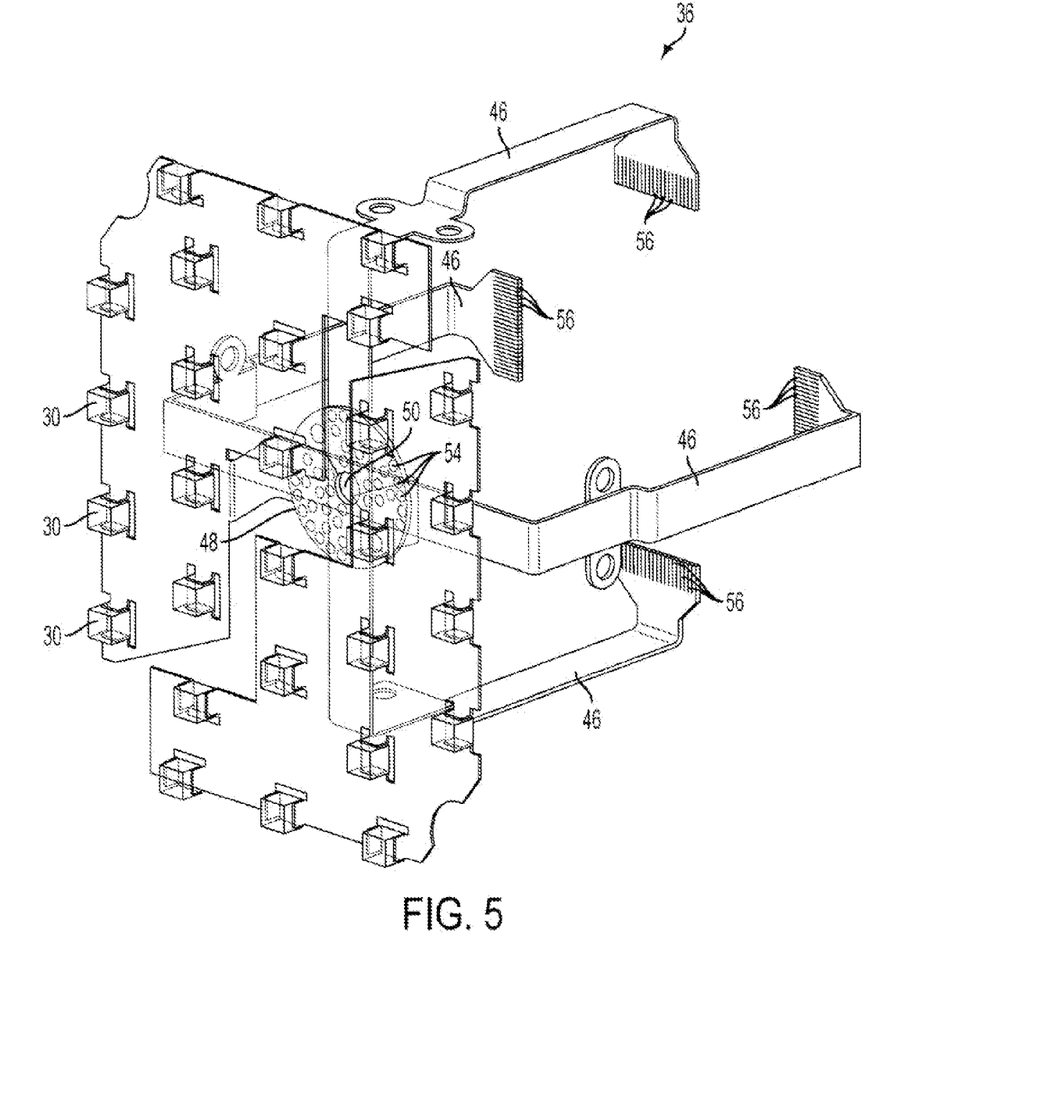
FIG. 5 illustrates an electrical interface, according to one or more embodiments of this disclosure.

FIG. 5 illustrates arms 46 and annular junction 48 of diaphragm suspension assembly 36, in addition to deformation actuators 30. As can be seen in FIG. 5, arms 46 and annular junction 48 are formed as flexible circuit elements such that electrical leads are carried the length of arms 46 and into annular junction 48. Annular junction 48 includes contacts 54 formed thereon, which mate to contact formed on substrate 28 (not shown in FIG. 5). Arms 46 include contacts 56 configured to interface with deformation drive circuit 24 (not shown in FIG. 5). By virtue of the electrical leads carried within arms 46, signals are conveyed from deformation drive circuit 24 to deformable mirror assembly 16. Arms 46, annular junction 48, and contacts 54 form an electrical interface configured to electrically couple deformable mirror assembly 16 (not shown in FIG. 5) with deformation drive circuit 24 (not shown in FIG. 5).

Figure 6:
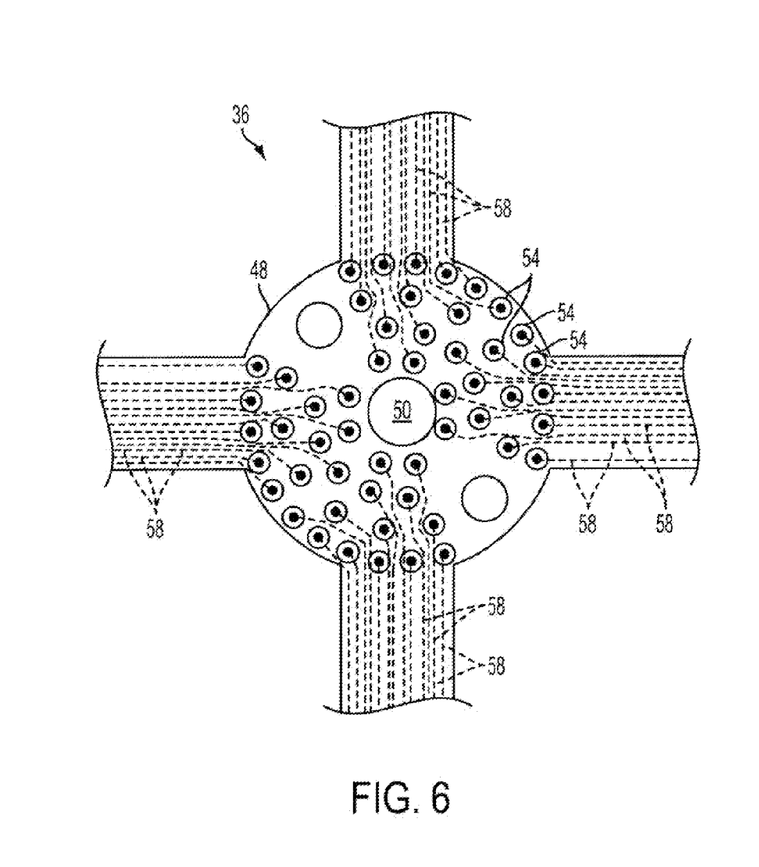
FIG. 6 illustrates an annular junction of an electrical interface, according to one or more embodiments of this disclosure.

FIG. 6 illustrates a portion of diaphragm suspension assembly 36. In particular, FIG. 6 illustrates annular junction 48 and portions of arms 46. FIG. 6 shows electrical leads 58 carried within arms 46 to contacts 54.

Figure 7:
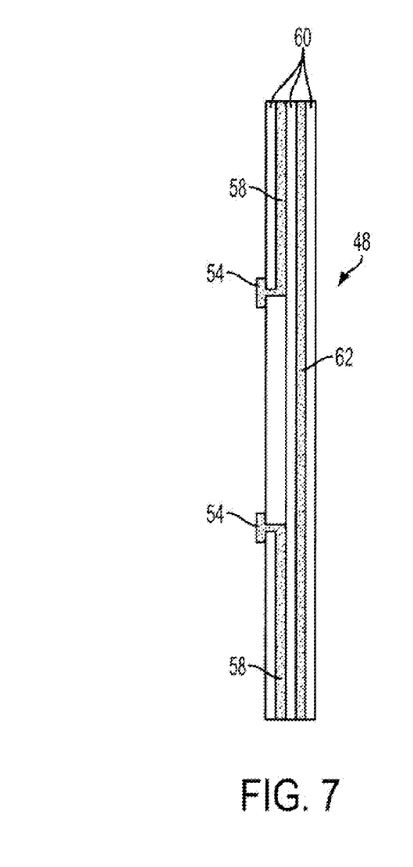
FIG. 7 illustrates a section of a portion of an electrical interface, according to one or more embodiments of this disclosure.

FIG. 7 illustrates a section of annular junction 48, including two contacts 54. The electrical leads 58 can be seen in FIG. 7 disposed between layers 60 of resiliently elastic polymer. An additional layer 62 of conductive material may be included between layers 60 to enhance strength.

Figure 8:
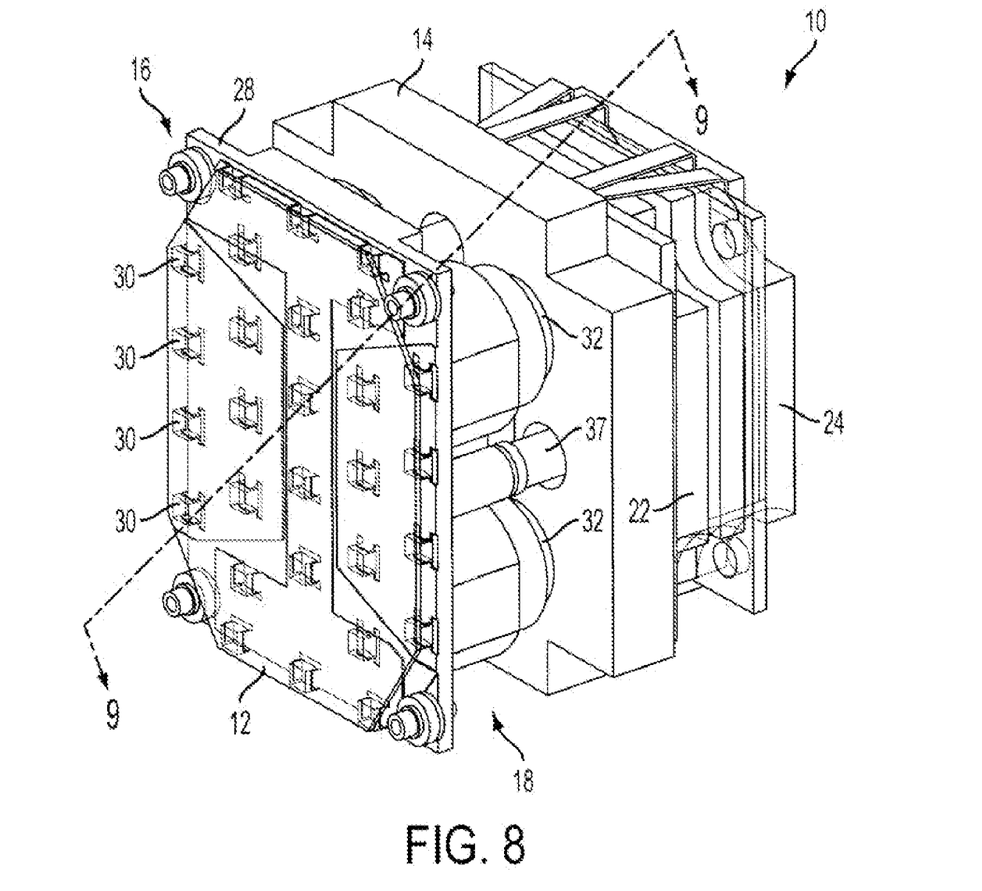
FIG. 8 illustrates a fast-steering, deformable mirror system, in accordance with one or more embodiments of this disclosure.
Figure 9:
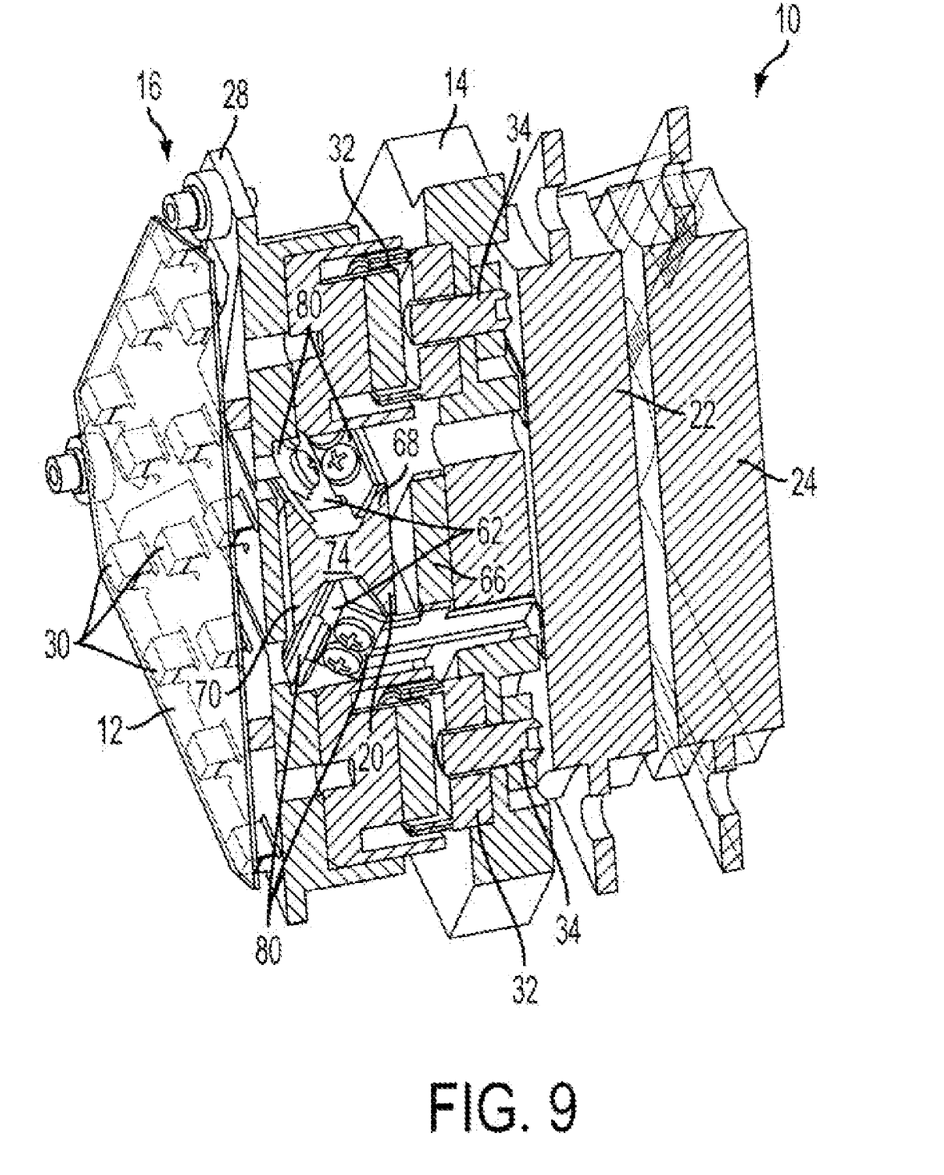
FIG. 9 illustrates a section of a fast-steering, deformable mirror system, in accordance with one or more embodiments of this disclosure.

FIG. 8 illustrates some embodiments of system 10 in which a set of flex blade members 64 are implemented to provide the suspension assembly. FIG. 9 illustrates a cross-section of system 10 taken along section line 9-9. The section shown in FIG. 9 illustrates the internals of steering actuators 32 and pickoff members 34, and provides a partial view of how mirror mount assembly 20 holds deformable mirror assembly 16 in place with respect to base 14 along with the suspension assembly formed in part from flex blade members 64.

Figure 10:
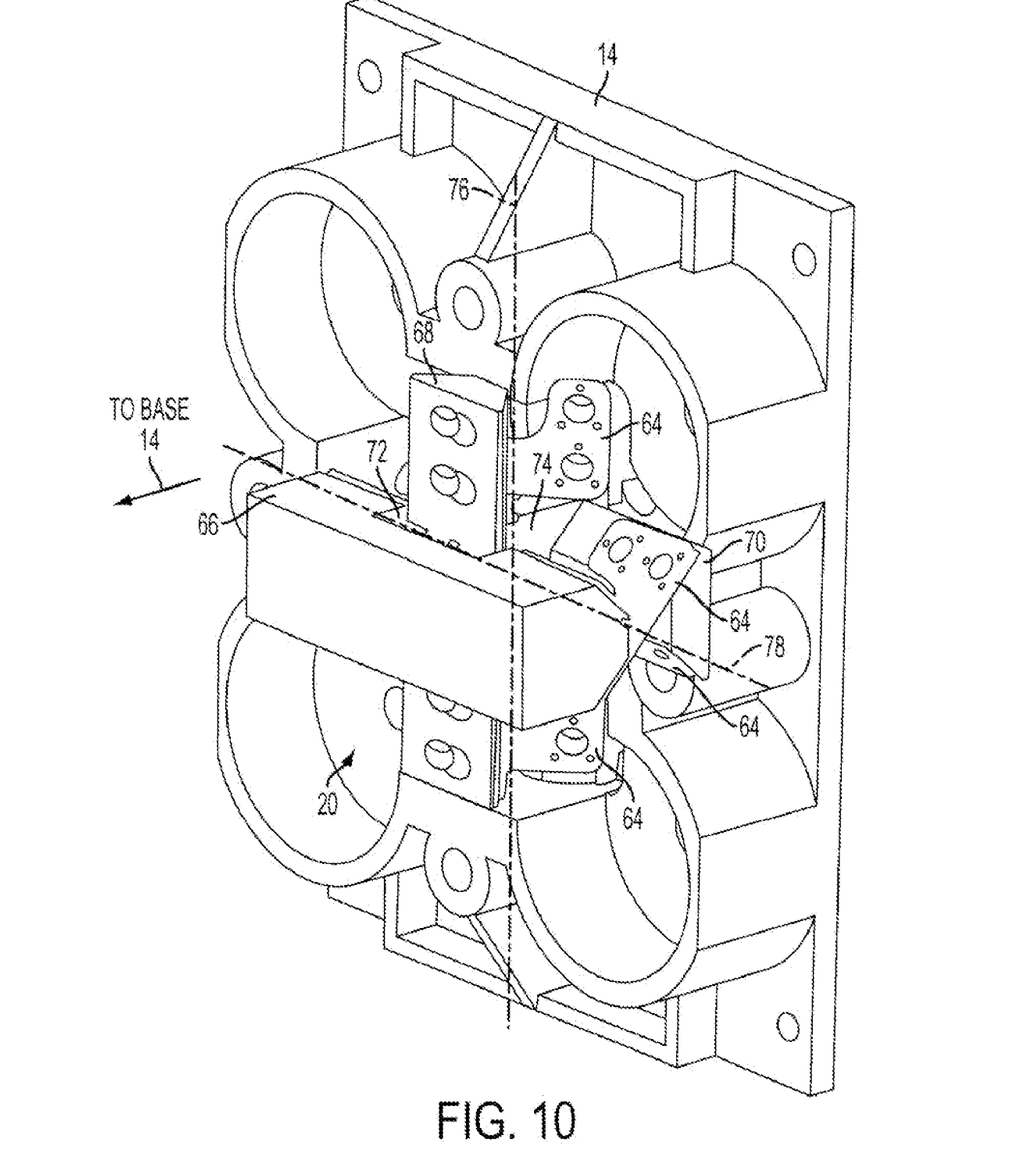
FIG. 10 illustrates a mirror mount assembly, according to one or more embodiments of this disclosure.

To illustrate the manner in which deformable mirror assembly 16 and base 14 are held by mirror mount assembly 20 and the suspension assembly to be movable in at least two degrees of freedom, FIG. 10 illustrates mirror mount assembly 20 and the suspension assembly in detail. As can be seen in FIG. 10, mirror mount assembly 20 may include one or more of base interface 66, first gimbal member 68, second gimbal member 70, and/or other components.

Base interface 66 is mounted directly to base 14 (not shown in FIG. 10) in a fixed configuration with base 14. Base interface 66 is formed having an elongated (e.g., generally rectangular) cross section (from the direction of base 14). Opposite the side at which base interface 66 is connected to base 14, base interface 66 is tapered, and includes a cutaway 72 in which first gimbal member 68 is disposed, unattached from base interface 66. Base interface 66 may be formed from aluminum alloys, stainless steels, beryllium, or low expansion nickel alloys, and/or other materials.

The cross section of first gimbal member 68 (from the direction of base 14) is elongated (e.g., generally rectangular). First gimbal member 68 is disposed in cutaway 72 such that the length-wise direction of first gimbal member 68 is perpendicular to the length-wise direction of base interface 66. On a side opposite base 14, first gimbal member 68 is tapered along its lengthwise edges.

First gimbal member 68 and second gimbal member 70 are secured together and/or formed integrally. First gimbal member 68 and second gimbal member 70 are connected by intermediate portion 74. First gimbal member 68, second gimbal member 70, and/or intermediate portion 74 may be formed from aluminum alloys, stainless steels, beryllium, or low expansion nickel alloys, and/or other materials.

Second gimbal member 70 has a cross section (from the direction of base 14) that is elongated (e.g., generally rectangular). Second gimbal member 70 is connected to first gimbal member 68 such that the length-wise direction of second gimbal member 70 is perpendicular to the length-wise direction of first gimbal member 68. On a side of second gimbal member 70 opposite base 14, second gimbal member 70 is secured to substrate 28. The interface between second gimbal member 70 and substrate 28 may be fixed or substantially fixed. On the side of second gimbal member 70 facing base 14 (e.g., opposite the interface with substrate 28), second gimbal member 70 is tapered along its length-wise edges.

Flex blade members 64 are used to attach length-wise edges of second gimbal member 70 with opposing length-wise edges of base interface 66. Additional flex blade members 64 are used to attach length-wise edges of first gimbal member 68 to substrate 28. Due to the elasticity of flex blade members 64, these attachments permit pivoting of deformable mirror assembly 16 with respect to base 14 about a first axis of rotation 76 and a second axis of rotation 78. The elasticity of flex blade members 64 may further permit linear movement of deformable mirror assembly 16 with respect to base 14. The resilient elasticity of flex blade members 64 biases deformable mirror assembly 16 and base 14 into the default position shown in FIGS. 8-10. The flex blade members 64 are secured to base interface 66, first gimbal member 68, and second gimbal member 70 by clamps which are not shown in FIG. 10, but which are illustrated in FIG. 9 as elements 80.

Figure 11:
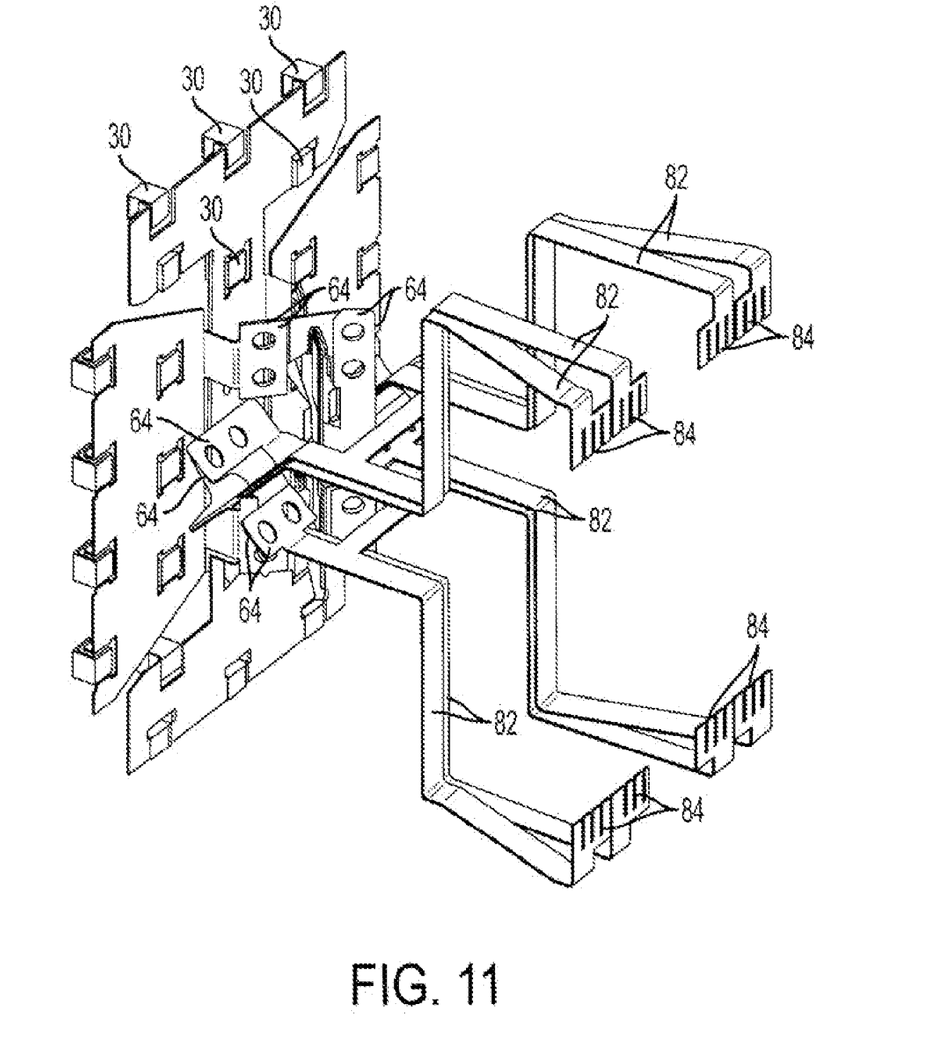
FIG. 11 illustrates an electrical interface, according to one or more embodiments of this disclosure.

FIG. 11 shows the flexible elements of the suspension assembly, including demand field 64 without any of the other components of system 10 other than deformation actuators 30. As can be seen in FIG. 11, the suspension assembly includes demand field 64 overlapped over each other such that flex blade members 64 carried by different components of mirror mount assembly 20 (e.g., base interface 66, first gimbal member 68, and/or second gimbal member 70 shown in FIG. 10) provide signals across the interfaces between the components. Thus, flex blade members 64 provide signal paths across the movable interface between base 14 (not shown in FIG. 11) and deformable mirror assembly 16 (not shown in FIG. 11).

As is shown in FIG. 11, a set of lines 82 connect flex blade members 64 attached to base interface 66 (not shown in FIG. 11) with deformation drive circuit 24 (not shown in FIG. 11). Lines 82 may be formed from the same materials as flex blade members 64, or lines 82 may be formed from different materials from flex blade members 64. At ends of lines 82 opposite flex blade members 64, a set of electrical contacts 84 is formed. Electrical contacts 84 are configured for electrical coupling with deformation drive circuit 24 (not shown in FIG. 11). Flex blade members 64, lines 82, and electrical contacts 84 form an electrical interface configured to electrically couple deformable mirror assembly 16 with deformation drive circuit 24.

Figure 12:
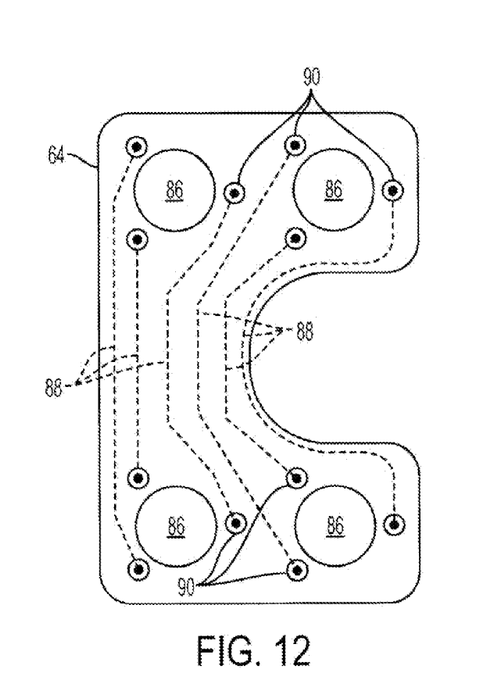
FIG. 12 illustrates a portion of an electrical interface, according to one or more embodiments of this disclosure.

FIG. 12 illustrates the configuration of one of flex blade members 64. Flex blade member 64 is formed as a relatively flat, flexible member. Flex blade members 64 includes openings 86, which are configured to facilitate secure attachment of flex blade member 64 to other components. As can be seen in FIG. 12, a set of electrical lines 88 are formed in flex blade member 64 that provide electrical couplings with electrical contacts 90.

Figure 13:
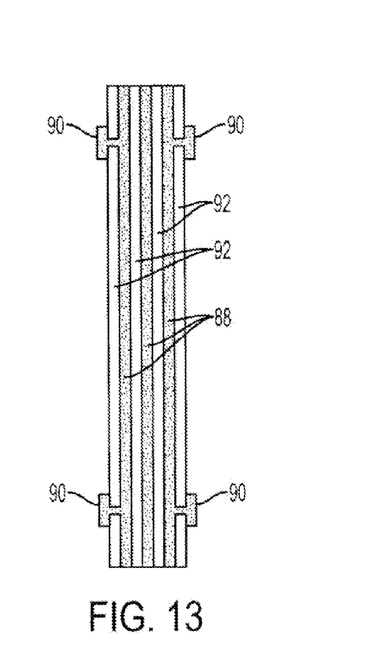
FIG. 13 illustrates a section of an electrical interface, according to one or more embodiments of this disclosure.

FIG. 13 illustrates a section of flex blade member 64. In the section view, electrical lines 88 can be seen formed between layers 92 of elastic polymer that provide flex blade member 64 with its flexibility. Extra layer 94 of conductor may be disposed between layers 92 to provide flex blade member 64 with enhanced strength.

Figure 14:
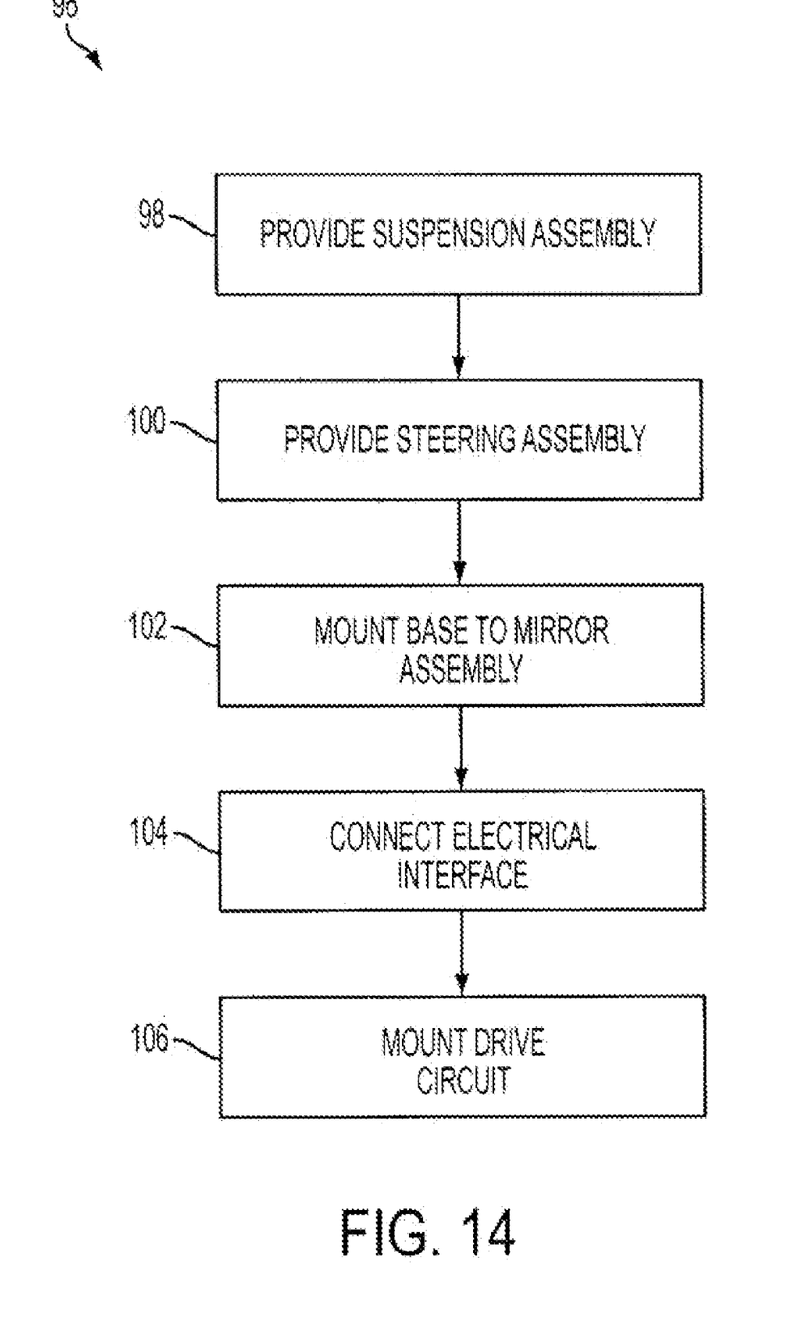
FIG. 14 illustrates a method of manufacturing a fast-steering, deformable mirror system, in accordance with one or more embodiments of this disclosure.

FIG. 14 illustrates method 96 of manufacturing or assembling a fast-steering, deformable mirror system. The operations of method 96 presented below are intended to be illustrative. In some embodiments, method 96 may be accomplished with one or more additional operations not described, and/or without one or more of the operations discussed. Additionally, the order in which the operations of method 96 are illustrated in FIG. 14 and described below is not intended to be limiting.

At operation 98, a suspension assembly is provided. The suspension system is configured to flexibly bias a deformable mirror assembly into a default position with respect to a base. The suspension system may be similar to or the same as the suspension systems illustrated, for example, in FIGS. 2-13 and described above.

At operation 100, a mirror steering assembly may be provided. The mirror steering assembly is configured to actuate the deformable mirror assembly as a unit with respect to the base. In some implementations, the mirror steering assembly may be similar to or the same as mirror steering assembly 18 (shown in FIGS. 1-4, 8, and 9, and described above).

At operation 102, the base may be mounted to the deformable mirror assembly. Upon mounting, the deformable mirror assembly is movable as a unit with respect to the base with at least to degrees of freedom. In some implementations, operation 102 may include mounting the deformable mirror assembly to the base using a mirror mount assembly similar to or the same as mirror mount assembly 20 (shown in FIGS. 1, 3, 4, 9, and 10, and described above).

At operation 104, an electrical mirror interface is connected to the base and the mirror assembly. The electrical mirror interface is configured to electrically couple the deformable mirror assembly with a drive circuit to convey drive signals from the drive circuit to the deformable mirror assembly. The electrical mirror interface may be formed in part from an elastically resilient polymer material. The electrical mirror interface may form at least a portion of the suspension system. In some implementations, the electrical mirror interface may be similar to or the same as the electrical interfaces illustrated in FIGS. 5 and 11.

Although various embodiments have been described in detail for the purpose of illustration based on what is currently considered to be the most practical embodiment, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A fast-steering, deformable mirror system comprising:
a base;
a deformable mirror assembly comprising a reflective surface and a plurality of deformation actuators configured to controllably deform the reflective surface;
a mount assembly configured to mount the deformable mirror assembly to the base such that the deformable mirror assembly is movable as a unit with respect to the base with at least two degrees of freedom;
a mirror steering assembly configured to actuate the deformable mirror assembly as a unit with respect to the base; and
an electrical mirror interface physically connected to each of the base and the deformable mirror assembly, the electrical mirror interface being formed in part from an elastically resilient polymer material and configured to convey control signals that drive the deformation actuators from the base to the deformable mirror assembly via signal paths provided by the mount assembly.

2. The system of claim 1, wherein the deformable mirror assembly is movable as a unit with respect to the base about first and second axes and is linearly movable.

3. The system of claim 1, wherein the mount assembly comprises:
   a base interface mounted to the base;
   first and second gimbal members; and
   an intermediate portion by which the first and second gimbal members are perpendicularly connected.

4. The system of claim 3, wherein the electrical mirror interface comprises:
   flex blade members configured to attach the second gimbal member with the base interface; and
   additional flex blade members configured to attach the first gimbal member with the deformable mirror assembly.

5. The system of claim 1, further comprising a suspension assembly configured to flexibly bias the deformable mirror assembly into a default position with respect to the base, wherein the electrical mirror interface forms at least a portion of the suspension assembly.

6. The system of claim 5, wherein the electrical mirror interface exclusively provides a substantial bias to the deformable mirror assembly biasing the deformable mirror assembly toward the default position.

7. The system of claim 5, wherein the electrical mirror interface exclusively provides any bias to the deformable mirror assembly biasing the deformable mirror assembly toward the default position.

8. The system of claim 1, wherein the mirror steering assembly comprises one or more steering actuators configured to actively and controllably position the deformable mirror assembly with respect to the base.

9. The system of claim 1, further comprising a drive circuit from which the control signals are conveyed, wherein the drive circuit is held at a relatively fixed position with respect to the base.

10. The system of claim 1, wherein the electrical mirror interface is a flexible circuit formed in part from one or more of polyimide, polyether ether ketone, or polyesther.

11. The system of claim 10, wherein at least a portion of the flexible circuit is covered by an electrically insulating polymer layer.

12. A method of manufacturing a fast-steering, deformable mirror system, the method comprising:
   disposing a mount assembly to mounting a base and a deformable mirror assembly such that the deformable mirror assembly is movable as a unit with respect to the base with at least two degrees of freedom, wherein the deformable mirror assembly comprises a reflective surface and a plurality of deformation actuators configured to controllably deform the reflective surface;
   providing a mirror steering assembly on the base, the mirror steering assembly being configured to actuate the deformable mirror assembly as a unit with respect to the base;
   connecting an electrical mirror interface formed in part from an elastically resilient polymer material physically to each of the base and the deformable mirror assembly, the electrical mirror interface being configured to convey control signals that drive the deformation actuators from the base to the deformable mirror assembly via signal paths provided by the mount assembly.

13. The method of claim 12, further comprising providing a suspension assembly configured to flexibly bias the deformable mirror assembly into a default position with respect to the base, wherein the electrical mirror interface forms at least a portion of the suspension assembly.

14. The method of claim 13, wherein the suspension assembly is formed such that the electrical mirror interface exclusively provides a substantial bias to the deformable mirror assembly biasing the deformable mirror assembly toward the default position.

15. The method of claim 13, wherein the suspension assembly is formed such that the electrical mirror interface exclusively provides any bias to the deformable mirror assembly biasing the deformable mirror assembly toward the default position.

16. The method of claim 12, wherein the mirror steering assembly is provided comprising one or more steering actuators configured to actively and controllably position the deformable mirror assembly with respect to the base.

17. The method of claim 12, further comprising mounting a drive circuit from which the control signals are conveyed to the system such that the drive circuit is held at a relatively fixed position with respect to the base.

18. The method of claim 12, wherein the electrical mirror interface is a flexible circuit formed in part from one or more of polyimide, polyetheretherketone, or polyesther.

19. The method of claim 18, wherein at least a portion of the flexible circuit is covered by an electrically insulating polymer layer.

20. A fast-steering, deformable mirror system comprising:
   a base;
   a deformable mirror assembly;
   a mount assembly configured to mount the deformable mirror assembly to the base such that the deformable mirror assembly is configured to be actuated as a unit with respect to the base;
   a steering assembly configured to actuate the deformable mirror assembly with respect to the base; and
   an electrical mirror interface physically connected to each of the base and the deformable mirror assembly, the electrical mirror interface being formed in part from an elastically resilient polymer material and configured to convey control signals from the base to the deformable mirror assembly via signal paths provided by the mount assembly.

* * * * *